United States Patent
Haack et al.

(10) Patent No.: US 7,517,561 B2
(45) Date of Patent: Apr. 14, 2009

(54) METHOD OF COATING A SUBSTRATE FOR ADHESIVE BONDING

(75) Inventors: Larry Haack, Ann Arbor, MI (US); Ann Straccia, Southgate, MI (US); Joseph Holubka, Livonia, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 141 days.

(21) Appl. No.: 11/162,746

(22) Filed: Sep. 21, 2005

(65) Prior Publication Data
US 2007/0065582 A1 Mar. 22, 2007

(51) Int. Cl.
*B05D 1/02* (2006.01)
*H05H 1/26* (2006.01)

(52) U.S. Cl. ............... 427/447; 427/488; 427/535; 427/562; 427/195; 427/422

(58) Field of Classification Search ........... 427/569, 427/166, 167, 488, 535, 447, 195, 562, 180, 427/422
See application file for complete search history.

(56) References Cited

U.S. PATENT DOCUMENTS

| | | | |
|---|---|---|---|
| 4,682,711 A | | 7/1987 | Reighard et al. |
| 4,724,106 A | * | 2/1988 | Morimoto et al. ........... 264/439 |
| 5,130,265 A | * | 7/1992 | Battilotti et al. ............. 438/49 |
| 5,185,182 A | * | 2/1993 | Brown ..................... 427/126.2 |
| 5,376,413 A | * | 12/1994 | Callebert et al. ............ 427/489 |
| 5,580,616 A | | 12/1996 | Niino et al. |
| 5,730,922 A | * | 3/1998 | Babb et al. ................. 264/258 |
| 6,218,004 B1 | * | 4/2001 | Shaw et al. ................. 428/336 |
| 6,503,564 B1 | * | 1/2003 | Fleming et al. .......... 427/255.6 |
| 6,649,225 B2 | | 11/2003 | Drzal et al. |
| 6,793,759 B2 | | 9/2004 | Chaudhury et al. |
| 6,841,263 B2 | * | 1/2005 | Anderson et al. ........... 428/640 |
| 6,875,303 B2 | | 4/2005 | Samurkas et al. |
| 7,176,268 B2 | * | 2/2007 | Lai et al. ..................... 528/26 |
| 2002/0129833 A1 | | 9/2002 | Drzal et al. |

(Continued)

FOREIGN PATENT DOCUMENTS

EP 0684281 11/1995

(Continued)

OTHER PUBLICATIONS

Akdogan, Ebru, et al. "A new method for immunosensor preparation: Atmospheric plasma torch." Surface and Coatings Technology 201 (2006) pp. 2540-2546.*

(Continued)

*Primary Examiner*—Bret Chen
(74) *Attorney, Agent, or Firm*—Damian Porcari; Brooks Kushman P.C.

(57) ABSTRACT

A method for depositing a coating onto a glass substrate for adhesive bonding. The process comprises depositing a coating where the surface is cleaned during a first time period, and depositing a high-velocity impact polymer reaction coating on the surface at ambient air pressure during a second time period using an atmospheric pressure air plasma. The coated glass can be bonded using a CASE compound, consisting of coatings, adhesives, sealants, elastomers, and combinations thereof. The opposing surface of the CASE compound is adjacent to a frame, such as an automotive vehicle windshield flange.

9 Claims, 3 Drawing Sheets

U.S. PATENT DOCUMENTS

| | | | |
|---|---|---|---|
| 2003/0098114 | A1 | 5/2003 | Samurkas et al. |
| 2003/0116281 | A1* | 6/2003 | Herbert et al. ............ 156/379.6 |
| 2003/0138573 | A1 | 7/2003 | Mikhael et al. |
| 2003/0207099 | A1 | 11/2003 | Gillmor et al. |
| 2003/0207145 | A1* | 11/2003 | Anderson et al. ............ 428/626 |
| 2005/0123705 | A1 | 6/2005 | Dronzek et al. |
| 2006/0162740 | A1* | 7/2006 | Kurunczi ..................... 134/1.1 |
| 2006/0237030 | A1* | 10/2006 | Hensley ...................... 134/1.1 |

FOREIGN PATENT DOCUMENTS

| | | |
|---|---|---|
| EP | 0 370 779 B1 | 2/1996 |
| EP | 1 524 248 A1 | 4/2005 |
| EP | 0 990 682 B1 | 11/2005 |
| WO | 0060640 | 10/2000 |
| WO | 03/000612 A1 | 1/2003 |
| WO | WO 03/048067 A1 | 6/2003 |
| WO | 2004/037936 A1 | 5/2004 |

OTHER PUBLICATIONS

Prat, R., et al., "Polymer Deposition using atmospheric pressure plasma glow (APG) discharge." Polymer 41 (2000) pp. 7355-7360.*

European Search Report, Dated Oct. 19, 2007, Ford Global Technologies, LLC, Application No. 07109042.7-1218, Reference P7974.

Modification of Polymeric Material Surfaces with Plasmas, Coates et al., Chapter IV of Plasma Processing of Advanced Materials MRS Bulletin, Aug. 1996.

Plasma Surface Treatment In Composites Manufacturing, Chang, Journal of Industrial Technology, vol. 15, No. 1 (Nov. 1998-Jan. 1999).

Surface Modification of Textile Fibers for Improvement of Adhesion to Polymeric Matrices: A Review, S. Luo et al.; Journal of Adhesion Science and Technology, (2002) 16(13), 1715-1735.

Chemical Reactions at Substrate Surface in Plasma Process, Y. Ando et al., Yosha (2002), 39(3), 23-127.

Improved Adhesion of Low-Density Polyethylene/EVA Foams Using Different Surface Treatments, M.D. Landete-Ruiz, et al., Journal of Adhesion Science and Technology (2002, 16(8), 1073-1101.

Surface Treatment of Biomedical Polymers for Enhanced Adhesion, V. Barron, et al. Materials Research Society Symposium Proceedings (2001), 662.

Plasma Surface Treatments of Melt-Extruded Sheets of Poly(L-lactic acid), T. Hirotsu, Polymer Engineering and Science (2002) 42(2), 299-306.

Study of Physico-Chemical Surface Treatments on Dyeing Properties of Polyamides. Part 1: Effect of Tetrafluoromethane Low Temperature Plasma, J. Yip, Coloration Technology (2002), 118(1), 26-30.

Plasma Surface Treatment of Aerospace Materials for Enhanced Adhesive Bonding, W. Leahy et al., Journal of Adhesion (2001), 773(3), 215-249.

Review of Progress n Surface Treatments for Magnesium Alloys, M. Yao, Cailiao Baohu (2001), 34(10), 19-21.

TOF-SIMS Ability to Quantify Surface Chemical Groups: Correlation with XPS Analysis and Spectrochemical Titration, N. Medard, et al., Belg. Surface and Interface Analysis (2001), 31(11), 1042-1047.

Surface Modification of Polymer Surfaces: Atmospheric Plasma Versus Vacuum Plasma Treatments, M. Shenton, Journal of Physics D: Applied Physics (2001), 34(18), 2761-2768.

Plasma Processing of Polymers for Enhanced Adhesion to Metals and Other Materials, F. Arefi-Khonsari et al., High Temperature Material Processes (2000), 4(4), 537-551.

Improvement of Adhesive Properties of Low Density Polyethylene Sheets and Poly(ethylene terephthalate) films by Various Surface Treatments, T. Ogawa et al., Kobunshi Ronbunshu (2000), 57(11), 708-714.

Surface Treatment of Polymer Matrix Composites for Adhesion, V. Barron et al., Proceedings of the Annual Meeting of the Adhesion Society (2000), 23rd 544-546.

Different Surface Treatments to Improve the Adhesion of Polypropylene, T. Zeiler, et al., Journal of Adhesion Science and Technology (2000), 14(5), 619-634.

Correlation Between Surface Tension and Physical Paint Properties, M. Osterhold et al., Progress in Organic Coatings (1998), 33(3-4), 197-201.

Plasma Surface Treatment for Improved Wettability and Rewettability, P. Spence, et al. INDA-TEC 97, International Nonwovens Technical Conference, Book of Papers, Cambridge, MA 09/8-10, 1997 (1997).

Ion Beam and Plasma Technology Development for Surface Modification at Los Alamos National Laboratory, H. Davis, et al. Materials Chemistry and Physics (1998), 54(1-3), 213-218.

Improvement of Adhesive Bonding of Thermoplastic Polymers by Different Surface Treatments, T. Zeiler et al., Macromolecular Symposia (1998), 126 (6th Dresden Polymer Discussion Surface Modification, 1997), 267-281.

A Review of Methods for Improving the Interfacial Adhesion Between Carbon Fiber and Polymer Matrix, L. Tang et al. Polymer Composites (1997), 18(1), 100-113.

Imaging Chemiluminescence Instrument for the Study of Heterogeneous Oxidation Effects in Polymers, G. Ablblad et al. Polymer Testing (1997), 16(1), 59-73.

Polymer Surface Modification by Plasmas and Photons, C.-M. Chan et al., Surface Science Reports (1996), 24($\frac{1}{2}$), 1-54.

Contact Angle Titration and ESCA Analysis of Polyester Surfaces Modified by Flame and Corona Surface Treatments, E. Wallace, Jr. et al., Annual Tech.Conf.-Soc. of Plastics Engs. (1995), 53rd(vol. 2), 2452-6.

Long-Term Performance of Adhesively Bonded Low Density Polyethylene After Various Surface Treatments for Enhanced Adhesion, D.Wu et al., Materials Science Forum (1995), 189-190(Interfaces II). 221-7.

Modification of Barrier Properties of Polymeric Films of LDPE and HDPE by Cold Plasma Treatment, A. Rossi et al. Journal of Polymer Engineering (1995), 14(2-3), 191-7.

Interface/Interphase Studies in Epoxy Matrix Composites, B. Okhuysen et al., Journal of Adhesion (1994), 45(1-4), 3-14.

Surface Treatment of Glass Fibers by Plasma, D. Wang et al., Xi'an Jiaotong Daxue Zuebao (1989), 23(5), 27-33 (Journal written in Chinese).

A System for in Situ Studies of Plasma-Surface Interactions Using X-ray Photoelectron Spectroscopy, J. Vossen et al., Journal of Vacuum Science & Technology, A:Vacuum, Surfaces, and Films (1983), 1(3), 1452-5.

Effects of Various Surface Treatments n Adhesive Bonding of Polyethylene, A. Devine et al., Adhesives Age (1969), 12(5), 35-7.

Surface Treatment of Plastics by Plasmajet, K. Kiyozumi et al., Nippon Setchaku Kyokaishi (1970), 6(4), 265-72.

Formation of Epoxy-Diamine/Metal Interphases, A. Roche et al., International Journal of Adhesion and Adhesives (2002), 22(6), 431-441.

Method and Apparatus, With Redundancies, For Treating Substrate Plastic Parts to Accept Paint without Using Adhesion Promoters, Brynolf, Russell; Elberson, Michael D., US Pat. Appln. Publ. (2002).

Novel Metal Pretreatments for Improved Adhesion of Paints Using Plasma Methods, W. Van Ooij et al., Int'l Congress of Adh.Science and Tech., etc., Amsterdam, Oct. 16-20, 1995 (1998) Meeting Date 1995, 355-371.

Mechanisms of Atmospheric Corrosion of Precoated Sheets, C.Barreau et al., Comm'n of the Euro.Comm., [Report] EUR (1997), (EUR 16720), 1-114.

Surface Treatment of Propylene Resin Molded Articles for Improved Paint Coatability, Shinonage, Hideo; Sogabe, Satoru, Eur. Pat. Appln. (1995).

Selected pages from Website http://www.iap.fraunhofer.de (14 pages).

Selected pages from Website http://www.ifam.fhg.de (12 pages).

Surface Modification of Polymeric Materials By Atmospheric Plasma Treatment, Y. Tsuchiya et al., Nippon Paint Col, Ltd., Proceedings-Int's Conf. in Org. Coatings, etc. 23rd, Athens, Jul. 7-11, 1997 (1997), pp. 257-270.

On The Energy Balance of Substrate Surfaces During Plasma Cleaning of Lubricants, H. Kersten et al., Vacuum/vol. 48 (1997), 48(2), pp. 123-128.

Autoglass Online, Industry Update, "Contamination Alleged, Accusations Fly", News & Events, Sep./Oct. 2004, www.glass.org/autoglass/maraprnews.htm.

SATAjet RP—http://www.sata.com/Produkte/produkt.jsp?index=02-01—5 Pages.

The Patent Office Patents Directorate—Patents Act 1977: Search Report under Section 17(5); Dec. 21, 2006; 3 Pages.

S. Gar/G. Vergason, "Plasma Polymerization: Theory and Practice", Vergason Technology, Inc., Van Etten, NY.

* cited by examiner

METHOD OF COATING A SUBSTRATE FOR ADHESIVE BONDING

BACKGROUND OF THE INVENTION

1. Field of the Invention

One aspect of the present invention relates to a method of coating a substrate for adhesive bonding.

2. Background Art

In producing many articles, often it is necessary to join dissimilar materials. In many cases, one or both of the materials must have their surface properties adjusted. Adjusting surface properties of materials in manufacturing often involve surface treatment technologies. Non-limiting examples of these surface properties include the surface energy, chemical inertness, conductivity, receiving dyes, and adhesion. Non-limiting examples of applications using surface treatment and preparation include anti-corrosion coatings on corrodible metals such as iron and steel; bio-compatible coatings on implants; waterproof layers on electronics; and adhesives on glass.

Applying coatings, adhesives, sealants, and elastomers (CASE) to substrates often require particular care in treating or pre-treating the surface to avoid adhesive failure between the substrate and the applied CASE compounds. Many CASE application processes involve steps of (a) cleaning or roughening the surface, (b) applying a primer that either bonds to the surface or etches it, and (c) applying an enhancement agent that adds additional bonding functionality. CASE compounds are used in industries including construction, automotive, medical, dental, labeling, electronics, and packaging.

In the automotive industry, CASE compounds are used in conjunction with glass glazing processes. Disadvantageously, automotive glazing glass is susceptible to breakage from mechanical shocks striking at its edges. As a consequence, the edges are typically encapsulated. In one encapsulation method, a frame connects the automotive glazing glass to the vehicular superstructure. The frame thereby borders portions of the glass. In one method for bonding the glass and frame components, the glazing glass is cleaned with a solvent, a primer containing a coupling agent to chemically modify the surface is applied to the surface, and finally, a thicker layer of a paint-like compound which bonds well to the frame is applied. In this example, properly aligning the two layers, i.e. primer and paint-like compound layers' present difficulties because the primer becomes effectively transparent on glass when dried and the second coating is opaque, prohibiting accurate alignment when the application width is wider than that of the primer coat.

When glazing glass is used as a windshield, it is intended to prevent mass and energy transfer into the passenger compartment, such as wind, rain, debris, and infrared heat, while contributing to passenger safety by increasing structural integrity during vehicle crash and rollover scenarios. In some instances, the glazing glass is not a homogeneous surface as it may have frits in some area to shade from infrared, ultraviolet and other wavelengths of light. Likewise, it may have areas that are tinted. Further, it may have gaps in these features to permit application of fasteners. These gaps may need labor-intensive masking during application of a second layer of sealant.

Other aspects of joining dissimilar materials include desires to improve accuracy of manufacturing, productivity, levels of automation, reliability, and/or manufacturability while decreasing harmful side effects, quantity of materials used, and/or waste of energy and materials. For example, some CASE compounds have substantial amounts of waste. Often coupling agent primers are less than 1% active agent and 99% carrier solvent. In another example, cleaning materials have harmful side affects such as flammability and/or noxious solvents like isopropyl alcohol or toluene. In other cases, paint-like layers often have to air dry within 30 seconds and so use volatile solvents. Energy and money are wasted to remediate these emissions and to protect workers' health.

Recently, plasma polymerization has been developed as a tool to modify material surfaces while improving manufacturability, levels of automation, and accuracy of manufacturing, while decreasing harmful side effects as well as waste of energy and materials.

There are different types of plasmas that are defined by their output temperature, their pressure conditions, as well as the equilibration state regarding the chemistry and thermal state. For example, there are plasmas created under subambient pressure conditions. Examples include a high plasma density mode and a low plasma density mode plasma generated with a magnetron which is typically used in physical vapor deposition. Other ambient pressure examples include glow discharge, inductively-coupled, and recombining plasmas. The glow discharge is characterized by low velocity movement of gas of a few meters/second. It features both thermal and chemical non-equilibrium. An inductively-coupled plasma has low to moderate gas movement. It features local thermal equilibria. The recombining nitrogen or air plasmas have high gas velocities of approximately 1 km/sec and feature chemical equilibria. Additional examples of classes of plasmas are determined by their ionization methods such as microwave resonance and electrical discharge.

When plasmas are applied to high volume production processes outside a laboratory, additional manufacturability and automation considerations arise such as speed of operation, compatibility with substrates, and contamination.

In many applications, the plasma treatments occur quickly, typically on the order of nanoseconds to a few minutes, which effectively preclude batch vacuum techniques such as physical vapor deposition.

The high temperature plasmas may thermally combust or thermally shock substrates, especially ones with low thermal conductivity as well as low melting or combustion points.

In addition, some surfaces are imperfect, such as those having dust, organic body oils, and debris from shipment and handling.

In light of the foregoing, what is needed is a method that improves accuracy of manufacturing, productivity, levels of automation, reliability, and/or manufacturability while decreasing harmful side effects, quantity of materials used, and/or waste of energy and materials for a high volume production process for preparing a surface for joining two dissimilar materials or to receive CASE compounds.

SUMMARY OF THE INVENTION

An embodiment of the present invention is a method for depositing a coating where the surface is cleaned during a first time period, and depositing a high-velocity impact polymer reaction coating on the surface at ambient air pressure during a second time period using an atmospheric pressure air plasma (APAP).

Another embodiment of the present invention is a method for applying a coating involving mixing a prepolymer vapor with a carrier gas or as a mist of small droplets, introducing that mixture into an atmospheric pressure air plasma to form a polymer reaction compound, and then applying the polymer reaction compound with high-velocity impact driven by the exiting gases of the atmospheric pressure air plasma.

A further embodiment of the present invention is a coated glass surface, having a glass surface such as a new or older windshield to which a high-velocity impact polymer reaction coating is directly applied using an atmospheric pressure air plasma after cleaning. An additional aspect of this embodiment includes having a second layer such as a sealant to join dissimilar materials, for example a windshield and frame. Another aspect of this embodiment includes making composite depositions of the high-velocity impact polymer reaction coating on a surface using either multiple travel paths or multiple APAPs traveling in a substantially sequential or substantially parallel travel path.

DETAILED DESCRIPTION OF EMBODIMENTS OF THE PRESENT INVENTION

Reference will now be made in detail to compositions, embodiments, and methods of the present invention known to the inventors. However, it should be understood that disclosed embodiments are merely exemplary of the present invention which may be embodied in various and alternative forms. Therefore, specific details disclosed herein are not to be interpreted as limiting, rather merely as representative bases for teaching one skilled in the art to variously employ the present invention.

Except where expressly indicated, all numerical quantities in this description indicating amounts of material or conditions of reaction and/or use are to be understood as modified by the word "about" in describing the broadest scope of the present invention. Practice within the numerical limits stated is generally preferred.

The description of a group or class of materials as suitable for a given purpose in connection with the present invention implies that mixtures of any two or more of the members of the group or class are suitable. Description of constituents in chemical terms refers to the constituents at the time of addition to any combination specified in the description, and does not necessarily preclude chemical interactions among constituents of the mixture once mixed. The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

Figure 1:
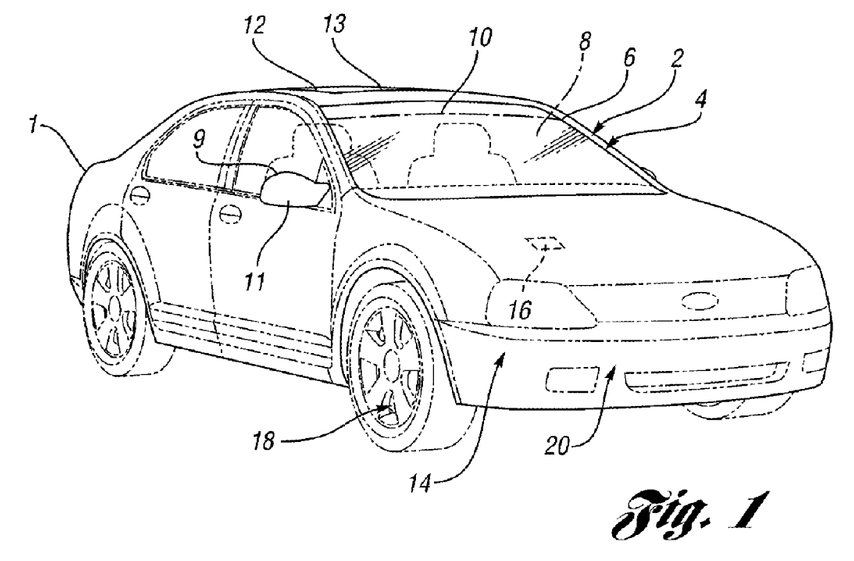
FIG. 1 shows an example of the application of certain embodiments of the present invention on a vehicle.

FIG. 1 shows on an automobile 1 having areas where dissimilar materials are joined, including the windshield 8, side windows 9, sunroofs 13, rear windows, and mirrors 11. Other areas where coatings, adhesives, sealants, and elastomers are used include, but are not limited to, metal surfaces, such as hubcaps 18; elastomeric trim strips for decoration 14; interior body parts; sunroofs seals 12; electronic circuit boards under the hood for engine control 16; plastic fascia 20 and may receive paint; and wear surfaces.

An automotive glazing windshield system may include a frame 4 attached to a vehicular body supersystem 2, a sealant, a primer, and a glass surface. The glass surface of the windshield 8 may include a frit 10 and/or a tinted region 6. Other examples of systems may include an elastomeric trim strip, an adhesive applied to this trim strip; a component part or an electronic circuit board under the hood with a waterproof coating with the board connected to the vehicle's electrical system.

Figure 2:
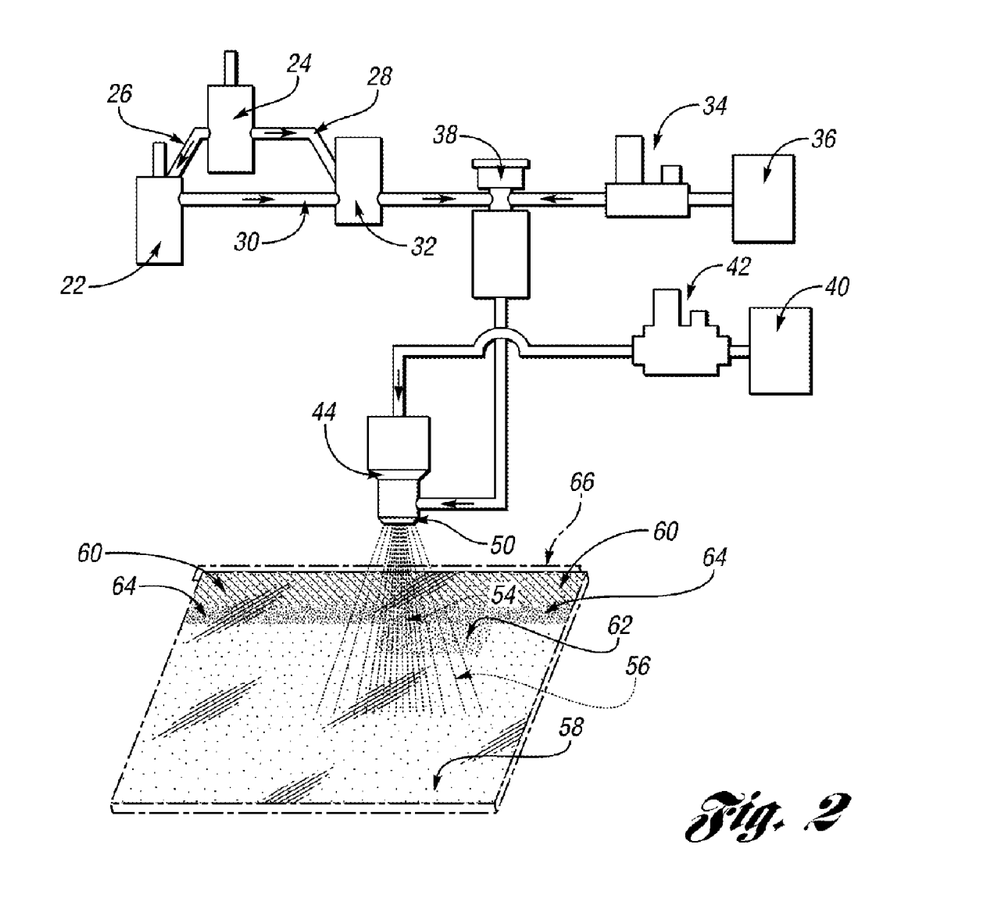
FIG. 2 shows an example of deposition of high-velocity impact polymer reaction coating onto a surface of certain embodiments of the present invention.

Referring to FIG. 2, in an atmospheric pressure air plasma (APAP) system, a polymerizable material in the form of prepolymer in a feedstock vessel 22 is supplied in tube 30 metered using a mass flow controller 32 and vaporized and mixed with a carrier gas in mixing chamber 38. The carrier gas is supplied from a carrier gas feedstock vessel 36 and introduced through a meter 34 into mixing chamber 38. This mixture is introduced into an atmospheric pressure air plasma apparatus 44 containing the plasma of ionized gas. The ionization gas comes from the ionization gas feedstock vessel 40 through a meter 42. The ambient air pressure around the air plasma apparatus ranges from greater than 50 kilopascals, 75 kilopascals, or 100 kilopascals and less than 300 kilopascals, 250 kilopascals, 200 kilopascals, or 150 kilopascals. At the exit nozzle 50, the high-velocity polymer reaction coating may achieve velocities greater than 10-m/s, 50-m/s, or 75-m/s, and less than 200-m/s, 150-m/s, or 125-m/s. The gases exiting the nozzle 50 at a temperature less than 450° C., 400° C., 350° C., 325° C., or 300° C. and greater than 70° C., 100° C., 125° C., or 150° C.; while the temperature of the substrate may be less than 95° C., 85° C., 75° C., 70° C., 65° C., 60° C., 55° C., or 50° C., depending upon the conditions of operation. This temperature at the substrate allows this process to work with substrates that are susceptible to heat damage.

The gases from the exit nozzle 50 form a spray pattern with the outer penumbra 56 having mostly ionized gas for cleaning and/or activating. Closer to the center of the spray pattern is in area of the higher concentration 54 of high-velocity impact polymer reaction coating material. The surface 58 receiving the high-velocity impact polymer reaction coating 62 is an automotive glazing glass windshield 28 having a ceramic frit 60 and tinted glass 64. The windshield is encapsulated within a frame 66.

The surface to receive the layer may be activatable by ionization and heat and may be in pristine condition, have a covering of debris, or be corroded. The surface may be cleaned, and partially activated, by an atmospheric pressure air plasma. Possible cleaning and activation mechanisms of an atmospheric pressure air plasma by itself may include repair of alkali depleted layers of weathered glass, ionization of the surface, modification of the surface energy, combustion of oils and dust or combinations thereof. When the atmospheric pressure air plasma is also a device depositing high-velocity impact polymer coatings of one embodiment of this invention, the penumbra of the atmospheric pressure air plasma exiting from the nozzle may have a cleaning function associated with the ionization and heat. Accordingly, in this embodiment, the time period between of the cleaning and/or activation step and the deposition step is greater than 1 µs, 5 µs, 10 µs, 25 µs, or 100 µs.

Another embodiment of this invention includes having one or more separate atmospheric pressure air plasmas to clean and/or activate the surface, followed by one or more separate atmospheric pressure air plasmas depositing high velocity in impact polymer coatings. The APAPs may be operated in a sequential manner, in a parallel manner or a combination thereof. When operated as a parallel set of multi-APAPs typical spacing may be about 2 mm.

The cleaning and/or activating operation may be capable of operating at higher travel speeds than the deposition operation or a combined cleaning and/or activating as well as a deposition operation. Other aspects of these embodiments may include having the cleaning operation using broader width passes and the deposition operation using their raster-type passes. The cleaning and/or activating operation may be accomplished using other ionization technologies such as corona discharge or combustion sources. Accordingly to this embodiment, the time periods between the cleaning/activation step and deposition is greater then 0.1 second, 1 s, 5 s, 10 s, 25 s, or 100 s and less than 150 s, 300 s, 10 minutes, 30 min, 1 hour, 12 hr, 1 day, 2 days, or 5 days.

An additional embodiment includes the ability to develop gradients of prepolymers where additional feedstock vessel 24 holding other prepolymers are fed through supply line 26 to the prepolymer feedstock vessel 22 in order to incrementally adjust the ratio or ratios of the prepolymers in the feedstock. An additional aspect of this embodiment has the other prepolymers fed through a supply line 28 to a metering device 32 that may be adjusted incrementally or step-wise based on the ratio or ratios of prepolymers.

In certain embodiments, the APAP can deliver a plasma air treatment to the surface coating to reactivate the surface coating. For example, the surface may be cleaned and coated in one location, and then shipped to a second location for reactivation at a later time.

Figure 3:
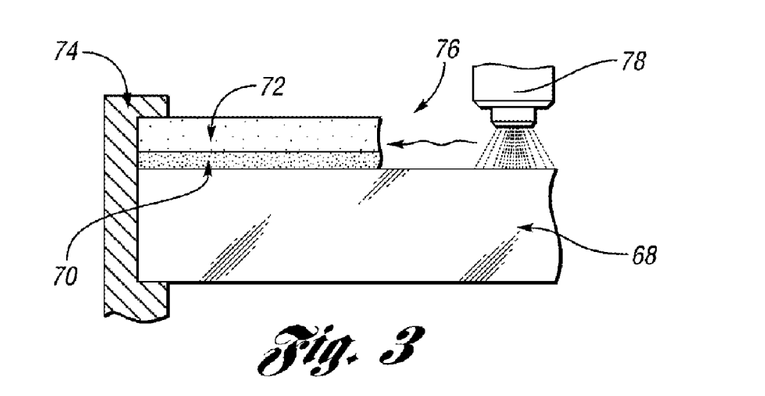
FIG. 3 shows another example of deposition of high-velocity impact polymer reaction coating onto a surface of certain embodiments of the present invention.

Referring to FIG. 3, in an embodiment of the present invention a surface 68 has a layered composite formed by a high-velocity impact polymer reaction coating 70 with a CASE compound 72 applied in a separate step, to connect the dissimilar materials of the surface 68 to the portions of the frame 74. The CASE compound is cured by light radiation 76 from the APAP 78 as it passes nearby during a subsequent raster deposition of the high-velocity impact polymer reaction coating.

Figure 4:
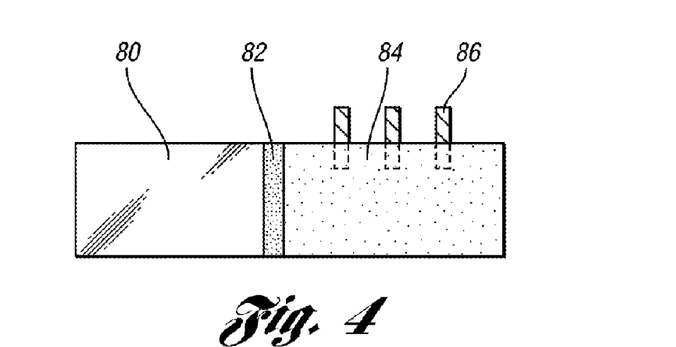
FIG. 4 shows an example of a coated glass surface having a high-velocity impact polymer reaction coating, a second layer, and a frame of certain embodiments of the present invention.

Referring to FIG. 4, in another embodiment of the present invention, a layered composite is formed to protect an electronic circuit board 80 and its solder lugs 86 from water, other fluids and vapors. The high-velocity impact polymer reaction coating 82 is applied to allow bonding to the board 80 and the lugs 86 of a further high-velocity impact polymer reaction coating 84 having waterproofing performance properties.

Figure 5:
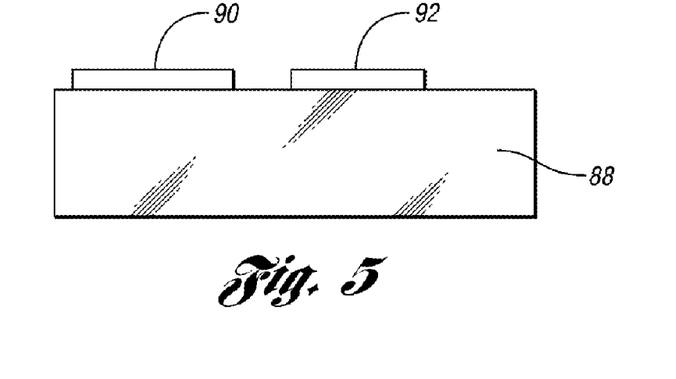
FIG. 5 shows an example of a coated glass surface having a composite high-velocity impact polymer reaction coating of certain embodiments of the present invention.

Referring to FIG. 5, in another embodiment of the present invention, a raster composite deposition is shown. In this embodiment, the surface 88 is treated with an APAP high-velocity impact polymer reaction coating 90 derived from one prepolymer. A second deposition 92 is parallel and translated from the first. The second deposition 92 may use an independently selected prepolymer to generate an APAP high-velocity impact polymer reaction coating.

Figure 6:
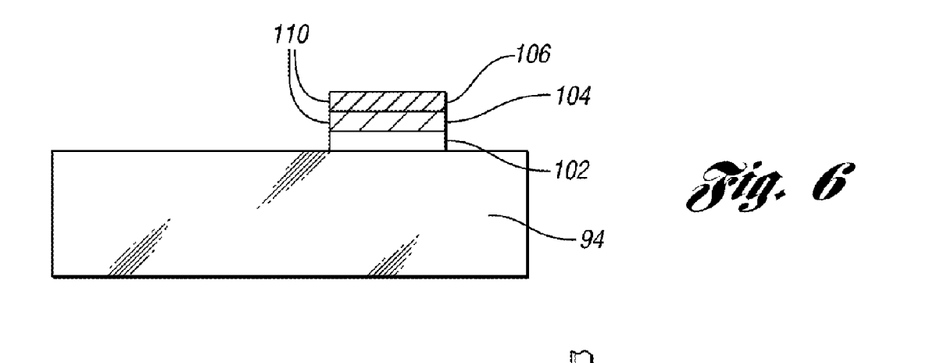
FIG. 6 shows an example of a coated glass surface having a composite high-velocity impact polymer reaction coating of certain embodiments of the present invention.

Referring to FIG. 6, in another embodiment of the present invention, layered composite depositions are shown. In this embodiment, surface 94 receives an APAP high-velocity impact polymer reaction coating. In one pass, an unbalanced composite is formed. A first pass 102 is a high-volume impact polymer reaction coating derived from a feedstock of 100% of a first prepolymer. A second pass 104 has a high-velocity impact polymer reaction coating derived from a feedstock of a mixture of the first prepolymer and a second prepolymer. In the third pass 106, the high-velocity impact polymer reaction coating is derived from a feedstock having 100% of the second prepolymer. The surface properties have now been modified to accommodate either a subsequent layer, not shown, to provide protective coatings and/or surface properties such as in chemical or biological protection textile surfaces or to provide more durable wear coatings to the underlying APAP high-velocity impact polymer reaction coatings.

Figure 7:
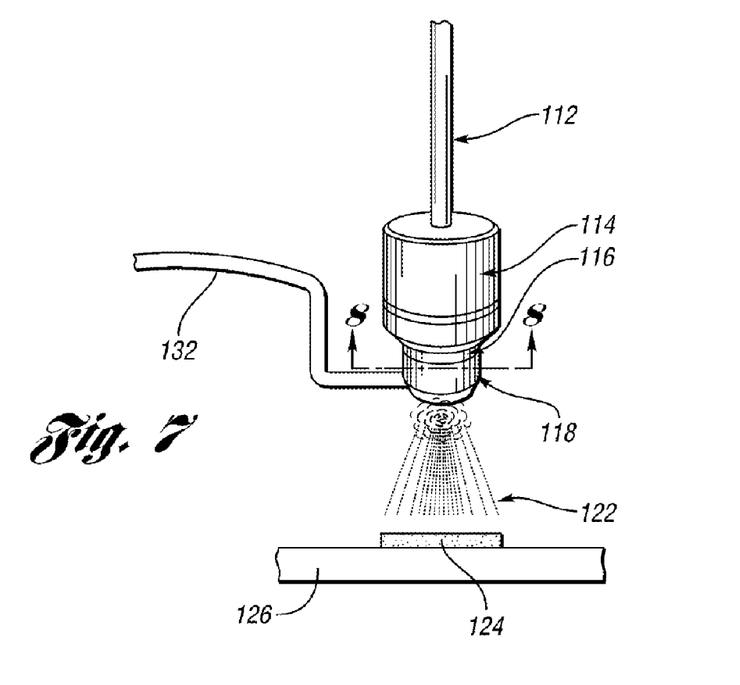
FIG. 7 shows an example of a prepolymer delivery system according to certain embodiments of the present invention.
Figure 8:
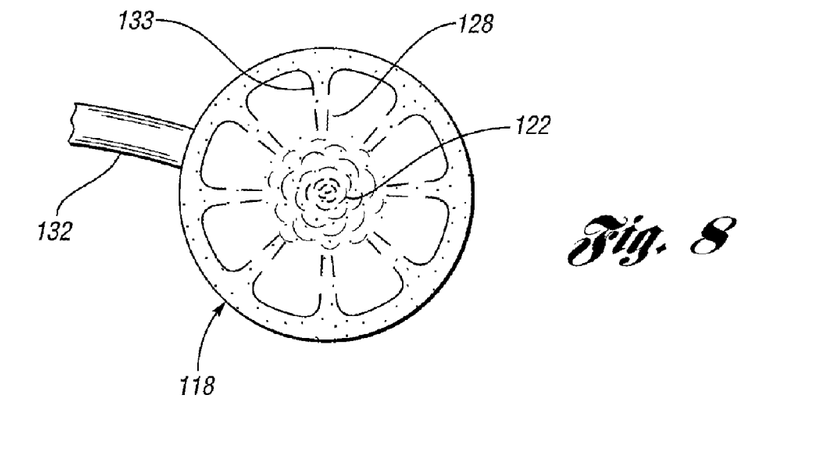
FIG. 8 shows a cross section of an atomizing collar taken about the line 8-8.

Referring to FIGS. 7 and 8, a prepolymer delivery system is shown where the ionization gas is supplied by a tube 112 into an APAP 114 having an exit nozzle 116 fitted with an atomizing collar 118, which facilitates the introduction of prepolymer mist 128 into high-velocity impact polymer reaction coating material 122. Prepolymer material is fed into injector 132, which delivers the material to atomizing jets 133 of atomizing collar 118 for generating the prepolymer mist 128. The high-velocity impact polymer reaction coating material 122 is applied to a surface 126 as a high-velocity impact polymer reaction coating 124.

Examples of surfaces that may be candidates for activation and deposition may include, but are not limited to, glassy material, a laminated windshield, glass for a vehicle, glass, corroded glass, glass having a frit, tinted glass, silicates, aluminates, borates, zirconia, transition metal compounds, steel, carbonates, bio-compatible material, calcium phosphate mineral, tetracalcium phosphate, dicalcium phosphate, tricalcium phosphate, monocalcium phosphate, monocalcium phosphate monohydrate, hydroxyapatite, laminated circuit boards, epoxy, wood, textile, natural fiber, thermoplastics, thermoset plastics, a surface with a melting temperature greater than 70° C., surfaces having components that may be susceptible to heat damage, or combinations thereof. In fritted and tinted glasses, the frit or the tint may be on the surface, dispersed in the surface, or combinations thereof. A surface having components that may be susceptible to heat may have components with properties such as melting or re-crystallizing temperatures of less than 400° C., 350° C., 300° C., 250° C., 200° C., 150° C., 100° C., or less than 100° C. Other indicators of a surface susceptible to heat damage may be having a service temperature of less than 350° C., 300° C., 250° C., 200° C., 150° C., 100° C., or less than 50° C.; or a material that experiences a glass transition temperature of less than 200° C., 150° C., 100° C., or less than 50° C.

Surfaces may also be considered susceptible to heat damage if they or the deposit have a coefficient of linear thermal expansion greater than about $10 \times 10^{-6}/°$ C., $15 \times 10^{-6}/°$ C., $20 \times 10^{-6}/°$ C., or $50 \times 10^{-6}/°$ C. Differential expansion rates between surface and an APAP deposit may result in incorrect dimensions or failures due to shear stresses. Surfaces may further be considered susceptible to heat damage if they have a chemical decomposition temperature of less than 400° C., 350° C., 300° C., 250° C., or less than 250° C. Decomposition may be considered an example of reactions where the material or bonds within the surface material chemically cleave. Other examples of chemical reactions where cleavage may occur are reactions such as combustion, dehydration, decarboxylation, pyrolysis, or oxidation.

Surfaces which are susceptible to heat damage may include those for making prototype molds and dies, as well as articles requiring repair or protective coatings. In addition, differences in thermal expansion between surface and applied melted material may cause residual stresses in the articles or in the solidified APAP-applied materials, warped articles, and fractures from thermal shock. Examples of these surface components that may be susceptible to heat damage include epoxy tools, silicone molds, tooling boards, modeling boards, foam boards, medium density fiberboards, fiber laminates, pattern lumber, machinable wax, thin shell tooling, and various materials used for rapid prototyping, such as laser-light-cured resins, laminated paper, wax, wood, foamed polymers, and sintered ceramics.

A surface susceptible to heat damage may also be a thin shell having little bulk into which to transfer excess heat. A typical thin shell may be less than 25-mm, 20-mm, 15-mm, 10-mm, 5-mm, 4-mm, 3-mm, 2-mm or even less than 1-mm thick.

A surface susceptible to heat damage may also be a material containing significant residual stresses. When exposed to heat of more than 50° C., 100° C., 150° C., or 200° C. and less than 400° C., 350° C., 300° C., or 250° C. these residual stresses may be released fully or partially. The result may be a dimensional distortion or warping of the surfaces that may be susceptible to heat damage.

Plasma polymerization yields polymers in arrangements not typically found under normal chemical conditions. The polymers may be have highly branched chains, randomly terminated chains, or functional crosslinking sites. Absent are regularly repeating units, in general. This is a result of the fragmentation of the prepolymer molecules when they are exposed to the high-energy electrons inherent in the plasma. The reactions appear to proceed by several reaction pathways including free radical formation, homolytic cleavage, cationic oligomerization, and combinations thereof.

The deposit resulting from reaction in an atmospheric pressure air plasma differs from conventional polymers, oligomers, and monomers. In conventional monomers, oligomers, and polymers there is a standard series of one or more building block units, also called mers. As the polymeric chains grow the building block units are repeated and occasionally cross-linked. In a plasma polymer, the building block units may be fragmented and have new functional groups developed. When they recombine, there may be generally higher crosslink density, an increased presence of branched chains, randomly terminated chains, or a combination thereof. The crosslink density calculation becomes more difficult as the number of cross links divided by the number of backbone atoms approaches unity. Such may be the case in plasma polymers. A relative measure of the crosslink density may be the shift in glass transition temperature relative to the conventional polymer. One may expect that at low degrees of crosslinking the shift upwards of the glass transition temperature will be to the number of crosslinks. In plasma polymers, the slope of the proportion may increase relatively by about 10%, 15%, or 20% compared to conventional polymers.

Prepolymers that may be suitable for deposition by atmospheric pressure air plasma include compounds that can be vaporized. The vapors may be metered and blended with a carrier gas. This mixture of gases may be introduced into a plasma generated by an atmospheric pressure air plasma. The ionization gas of the atmospheric pressure air plasma may be chosen from gases typical of welding processes which may include, but are not limited to, noble gases, oxygen, nitrogen, hydrogen, carbon dioxide, and combinations thereof.

Prepolymers used to create a high velocity impact polymer coating may include, but are not limited to, reactive substituted compounds of group 14 such as those corresponding to the formula $R_aX_{(3-a)}M_1\text{-O-}M_2R_bX_{(3-b)}$, where R is a hydrolysable organic radical possessing functionality imparting a desired characteristic, X may be a halogen, M is a group 14 element such as silicon, and O is oxygen; those corresponding to the formula $R_nM\ X_{(4-n)}$, where R may be a readily-hydrolyzable organic radical, M is a group 14 element such as silicon, and X may be a halogen; those corresponding to the formula $R_2MO$, wherein R is a hydrolyzable organic radical, M is a group 14 element, and O is oxygen; linear siloxanes; cyclical siloxanes; methylacrylsilane compounds; styryl functional silane compounds; alkoxyl silane compounds; acyloxy silane compounds; amino substituted silane compounds; hexamethyldisiloxane; tetraethoxysilane; octamethyltrisiloxane; hexamethylcyclotrisiloxane; octamethylcyclotetrasiloxane; tetramethylsilane; vinylmethylsilane; vinyl triethoxysilane; vinyltris(methoxyethoxy) silane; aminopropyltriethoxysilane; methacryloxypropyltrimethoxysilane; glycidoxypropyltrimethoxysilane; hexamethyldisilazane with silicon, hydrogen, carbon, oxygen, or nitrogen atoms bonded between the molecular planes; organosilane halide compounds; organogermane halide compounds; organotin halide compounds; di[bis(trimethylsilyl) methyl]germanium; di[bis(trimethylsilyl)amino] germanium; organometallic compounds based on aluminum or titanium; or combinations thereof. Candidate prepolymers do not need to be liquids, and may include compounds that are solid but easily vaporized. They may also include gases that compressed in gas cylinders, or are liquefied cryogenically and in vaporized in a controlled manner by increasing their temperature.

In certain embodiments, the thickness of the high velocity impact polymer coating may be increased sufficiently to create a seal with portions of a frame. The buildup of thickness can be accomplished by increasing the time the deposition is allowed to occur; by increasing the throughput of deposition; by volumizing the deposition; or combinations thereof. Increasing the time of deposition may involve, but is not limited to, holding the position of the APAP substantially in the same place for an extended period of time or using multiple APAPs to traverse the same location.

In another embodiment of this invention, multiple APAPs may deposit different prepolymers so as to create a layered composite deposition, different prepolymers in different spatial areas to create a rastered composite deposition, or combinations thereof.

Another embodiment of this invention involves applying the prepolymer as a primer using APAP. A second layer may then be applied to the primer to connect the primer to portions of the frame. In the non-limiting example where the second layer joins a windshield to a frame the bead of the high-velocity impact polymer coating may be as wide as 10 mm. The second layer typically is as wide or wider than the high-impact polymer coating. A second layer may include, but is not limited to, CASE compounds, polyurethane compounds, polyimide compounds, metal film, polyamide compounds, varnish, vulcanization compounds, organic membranes, corrosion-resistant compound, biocompatible coating, hydrophobic coating, hydrophilic compound, siloxane compounds, tin compounds, germanium compounds, ceramic frit, paint, epoxy, or combinations thereof. CASE compounds include, but are not limited to, protective coatings, anti-wear coatings, corrosion control coatings, paints, conformal coatings, epoxy protective coatings, acrylic protective coatings, alkyd protective coatings, polyurethane protective coatings, pressure sensitive adhesives, emulsion polymers, silicones, wood preservatives, thermoplastic elastomers, medical adhesives, coatings for fabrics, caulks, rubber compounds, powder coatings, carbon black, radiation-cured (radcure) compounds, and combinations thereof.

The adhesion of the second layer may be analyzed using the Quick Knife Analysis method. According to this method, after treatment of a surface adhesive beads of a CASE compound are applied to the surface and allowed to dry for a three day period. After three days, they are sliced diagonally with a razor. The sections are then twisted and pulled until they fail either adhesively, cohesively, or a combination thereof. The resulting failure mode is reported.

The frame may serve to protect and/or connect one or more parts of the dissimilar materials to the supersystem structure. The framing may be made of any number of materials so long as they suit the design purpose. Examples may include, but are not limited to, a metal channel or a polyurethane cap surrounding automotive glazing glass or solder tabs attached to circuit boards having waterproof coatings.

EXAMPLE 1

An APAP cleaning and activating step and a deposition of high-velocity impact polymer reaction coating occur in a single step. While not wanting to be tied to a single theory of operation, it appears that APAP gases exiting from the nozzle have a penumbra of ionized plasma that performs a cleaning and activating step, which will be referred to simply as cleaning, in a first time period followed very quickly and in one step by the deposition of the high-velocity impact polymer reaction coating which is concentrated at the core of the ionized plasma exiting from the nozzle.

In this example, a robotic arm, fitted with a FLUME APAP supplied by Plasma Treat North America, Inc. delivers a high-velocity impact polymer reaction coating derived from a prepolymer of hexamethyldisiloxane (HMDSO). Approximately 30 grams per hour of HMDSO is diluted with 5 L per minute of air. The mixture of HMDSO and air is introduced to an APAP. The ionization gas is introduced at 30 L per minute. The high-velocity impact polymer reaction coating is applied to a glass at a distance of 8 mm from the exit nozzle with a robotic arm travel velocity of up to 600 mm per second when directional changes are required such as in a raster pattern with a spacing of 2 mm between passes.

EXAMPLE 2

In this example, the cleaning and activation step occurs separately from the step of depositing the high-velocity impact polymer reaction coating. An APAP on a robotic arm traces a robotic gas at 25 mm per second. The same conditions are used as in Example 1.

In this example, a robotic arm, fitted with a FLUME APAP supplied by Plasma Treat North America, Inc. cleans the surface by passing a plasma over the surface. The ionization gas, air, is introduced at 30 L per minute. The cleaning plasma is applied to a glass at a distance of 8 mm from the exit nozzle with a track pitch of 2 mm with a robotic arm travel velocity of up to 600 mm per second when directional changes are required such as in a raster pattern with a spacing of 2 mm between passes. A second APAP follows the same robotic travel path as the cleaning plasma and delivers a high-velocity impact polymer reaction coating derived from a prepolymer of tetraethoxydisiloxane (TES). Approximately 30 grams per hour of TES is diluted with 5 L per minute of air. The mixture of TES and air is introduced to an APAP. The ionization gas is introduced at 30 L per minute. The high-velocity impact polymer reaction coating was applied to a glass at a distance of 8 mm from the exit nozzle with a robotic arm travel velocity of up to 600 mm per second when directional changes are required such as in a raster pattern with a spacing of 2 mm between passes.

EXAMPLE 3

This example shows that cleaning the surface followed by depositing the high-velocity impact polymer reaction coating in either one or two steps using an APAP improves adhesion of a second layer to glass relative to simply cleaning and activating the glass with an APAP, cleaning the glass with a solvent wipe of isopropyl alcohol, or applying the prepolymer by itself to the glass.

The test method to show the adhesion results is the Quick Knife Adhesion method. After treatment, adhesive beads of a CASE compound, in this case a polyurethane sealant, are applied to the surface and allowed to dry for a three day period. After three days, they are sliced diagonally with a razor. The sections are then twisted and pulled until the bead either fails adhesively or cohesively. The desired result is cohesive failure.

The surfaces used included standard automotive glazing windshield glass corroded automotive glazing in the form of dirty windshield glass that had been left open to the air for one year; windshield glass having a fritted area.

The results of this test are reported in Table 1.

TABLE 1

|  | Corroded Glass | Fritted Glass | Windshield |
|---|---|---|---|
| No treatment | Adhesive failure | Adhesive failure | Adhesive failure |
| HMDSO alone | Adhesive failure | 70% Adhesive failure; 30% Cohesive failure | 95% Adhesive failure; 5% Cohesive failure |
| APAP alone | Cohesive failure | Adhesive failure | Cohesive failure |
| Isopropyl Alcohol Solvent wipe | Adhesive failure | Adhesive failure | Adhesive failure |
| APAP + HMDSO one step | Adhesive failure | Cohesive failure | Cohesive failure |
| APAP + HMDSO two step | Cohesive failure | Cohesive failure | Cohesive failure |

In addition, the combination of corroded glass with a frit exposed to the same corroding conditions exhibited cohesive failure only in a two-step operation under the same deposition conditions.

EXAMPLE 4

This example shows creation of layered composite high-velocity impact polymer reaction coatings. The application conditions are similar to conditions in Example 2.

In this example, a separate APAP cleans and activates the surface. A second APAP on a robotic arm applies a 0.1 μm layer of high-velocity impact polymer reaction coating using HMDSO as the prepolymer. A third APAP on a robotic arm traces the same robotic pass as the second APAP and applies a 0.05 μm layer of high-velocity impact polymer reaction coating using octamethyltrisiloxane as the prepolymer.

EXAMPLE 5

This example shows creation of a rastered composite high-velocity impact polymer reaction coating. The application conditions are similar to conditions in Example 2.

In this example, a separate APAP cleans and activates the surface. A second APAP on a robotic arm applies a 0.1 μm layer of high-velocity impact polymer reaction coating using HMDSO as the prepolymer. A third APAP on a robotic arm traces a robotic pass parallel path which is translated 2 mm from second APAP path and applies a 0.1 μm layer of high-velocity impact polymer reaction coating using octamethyltrisiloxane as the prepolymer.

EXAMPLE 6

This example shows creation of an embodiment of a graded high-velocity impact polymer reaction coating. The application conditions are similar to conditions in Example 2.

In this example a separate APAP cleans and activates the surface. An second APAP on a robotic arm applies a 0.1 μm layer of high-velocity impact polymer reaction coating. The prepolymer starts as a pure HMDSO prepolymer. During a second robotic pass on the same robotic arm travel path as the first pass, the second APAP uses the prepolymer which is adjusted to an equal volume mixture of HMDSO and octamethyltrisiloxane. During a third robotic pass on the same robotic arm travel path as the first pass, the second APAP uses the prepolymer which is adjusted to pure octamethyltrisiloxane.

EXAMPLE 7

In this example, an embodiment is shown where advantage is taken of the ability to interrupt application of the high-velocity impact polymer reaction coating and/or the cleaning and activation step to create a mask on a surface. The application conditions are similar to conditions in Example 2.

In this example, a single APAP on a robotic arm cleans and activates the surface followed within 0.01 second by the deposition of a 1 μm layer the high-velocity impact polymer reaction coating. Using a preprogrammed signal, the APAP shuts off the ionization creating the plasma as well as the flow of the prepolymer. The robotic arm continues travel for a distance. Using a second preprogrammed signal the APAP resumes the cleaning and activation step and the deposition of the high-velocity impact polymer reaction coating.

After 0.5 seconds, another robotic arm applies a radiation-cured CASE sealant along the same robotic arm travel path that the APAP used. The infrared and/or ultraviolet light from the APAP cures the CASE sealant.

In a subsequent operation, the CASE sealant is sliced with a sharp implement at the interface between the spaces where the high velocity impact polymer reaction coating and the uncoated areas. The CASE sealant in the uncoated areas is then removed cleanly from the surface because it fails adhesively.

EXAMPLE 8

This example shows that the operating conditions of the plasma affect the composition of the high-velocity impact polymer reaction coating. In a physical vapor deposition system with a plasma chamber that is evacuated to 0.027 Pa pressure and the plasma is generated by a 40 kg Hertz magnetron, HMDSO prepolymer is injected. A chemical analysis of the resultant polymer reaction coating shows a silicon content of 19.8 atom percent (at %).

Using the conditions in Example 2, when HMDSO prepolymer is injected, the analysis of the resultant high-velocity impact polymer reaction coating has a silicon content of 32.0 at %. Coatings using this technique may be expected to have silicon content greater than 25 at %.

EXAMPLE 9

This example describes the temperature of the surface achieved using different parameters for speed of coating. At a distance between the exit nozzle and surface of 8 mm, when the robotic arm travels at 600 mm/second, the surface temperature reaches a maximum of 95° C. When the robotic arm travels at 50 mm/second, the surface temperature reaches a maximum of 180° C.

While the best mode for carrying out the invention has been described in detail, those familiar with the art to which this invention relates will recognize various alternative designs and embodiments for practicing the invention as defined by the following claims.

What is claimed is:

1. A method for coating a surface of a substrate to enhance adhesive bonding to the surface, the method comprising:
   (a) providing a substrate having a surface;
   (b) introducing a vapor of prepolymer molecules to an atmospheric pressure air plasma to form a polymer reaction compound by fragmenting the prepolymer molecules with the atmospheric pressure air plasma; and
   (c) depositing the polymer reaction compound onto the surface of the substrate with a high-velocity impact device at a velocity in the range of 10 to 200 meters per second.

2. The method of claim 1, wherein step (b) includes introducing the prepolymer vapor as a mist into the atmospheric air plasma.

3. The method of claim 1, wherein step (b) includes introducing a reactive substituted compound of group 14 having the formula $R_aX_{(3-a)}M_1\text{-}O\text{-}M_2R_b X_{(3-b)}$ as the prepolymer vapor into the atmospheric pressure air plasma to be fragmented to form the polymer reaction compound, where R is a hydrolysable organic radical, X is a halogen, M is a group 14 element such as silicon, and O is oxygen, or the formula $R_n M X_{(4-n)}$, where R is a readily-hydrolyzable organic radical, M is a group 14 element such as silicon, and X is a halogen.

4. The method of claim 1, wherein step (b) includes introducing hexamethyldisiloxane as the prepolymer vapor into the atmospheric air plasma to be fragmented to form the polymer reaction compound.

5. The method of claim 1, further comprising (d) activating the surface with an ionized gas before step (c) by depositing the ionized gas at a velocity in the range of 10 to 200 meters per second such that the surface of the substrate is cleaned and activated before step (c) of depositing the polymer reaction compound onto the surface.

6. The method of claim 5, wherein step (d) further comprising generating an outer penumbra of the atmospheric pressure air plasma.

7. The method of claim 5, wherein step (d) further comprising after the activating step, delaying a time period before starting step (c).

8. The method of claim 1, further comprising (d), after step (b), introducing a second vapor of second prepolymer molecules to the atmospheric pressure air plasma to form fragmented second prepolymer molecules, wherein the second prepolymer molecules of step (d) are chemically different from the prepolymer molecules of step (b).

9. The method of claim 8, further comprising (e) depositing the fragmented second prepolymer molecules onto the surface after step (c).

* * * * *